Nov. 1, 1932.                H. F. KURTZ                1,885,842
                       INDICATING LAMP FOR VEHICLES
                   Filed April 19, 1930      2 Sheets-Sheet 1
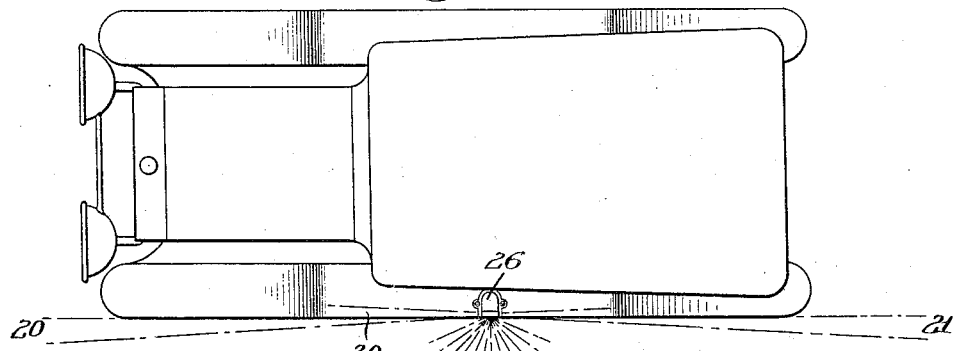
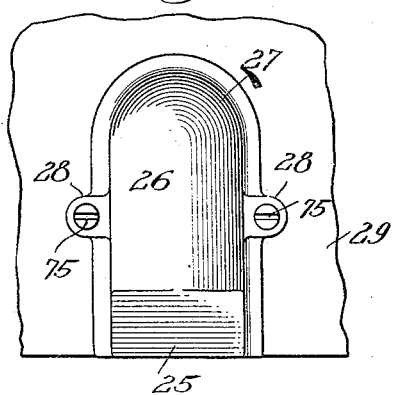
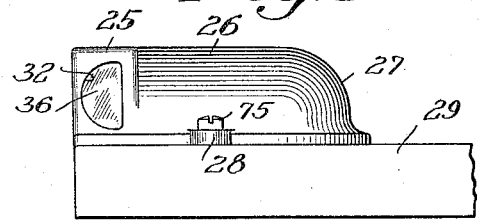
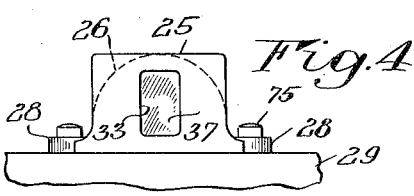
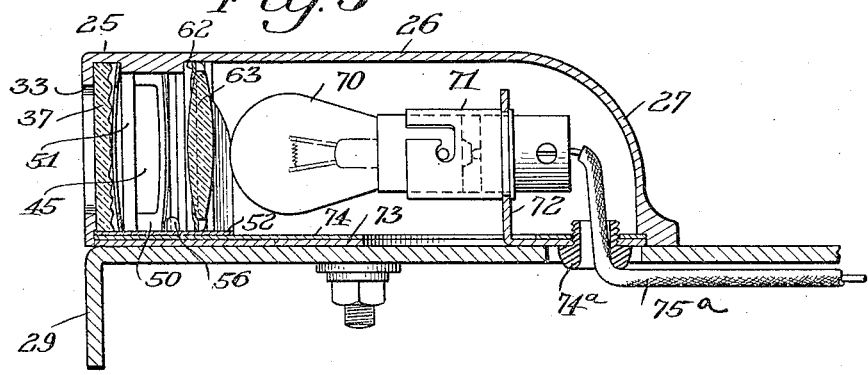
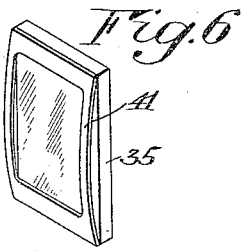
INVENTOR
Henry F. Kurtz
BY Edward H. Cumpston
his ATTORNEY Nov. 1, 1932.  H. F. KURTZ  1,885,842
INDICATING LAMP FOR VEHICLES
Filed April 19, 1930    2 Sheets-Sheet 2
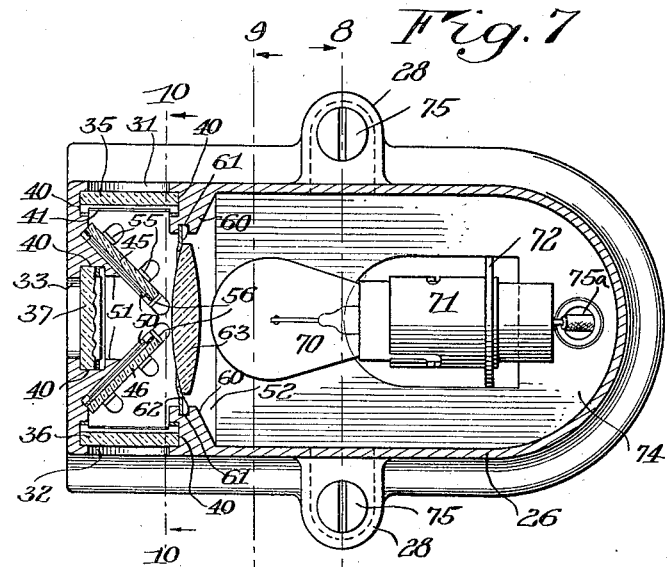
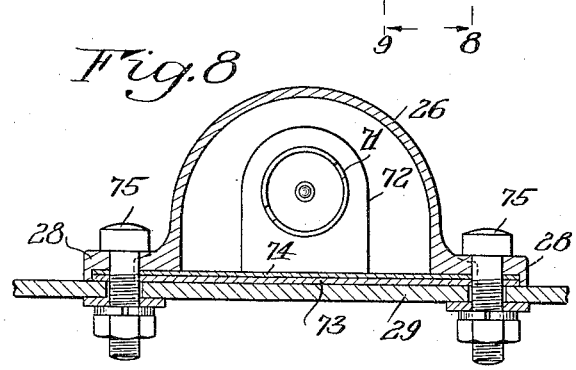
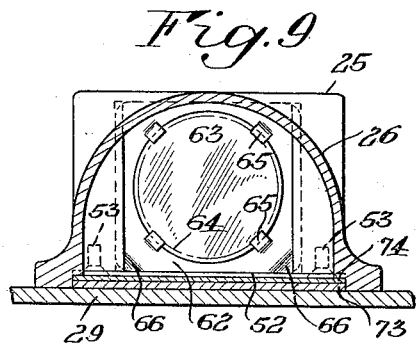
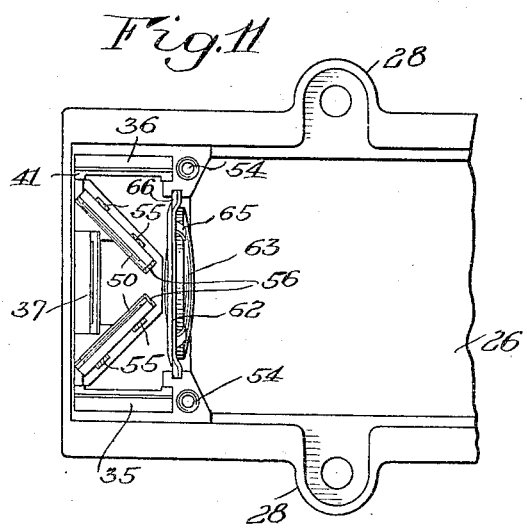
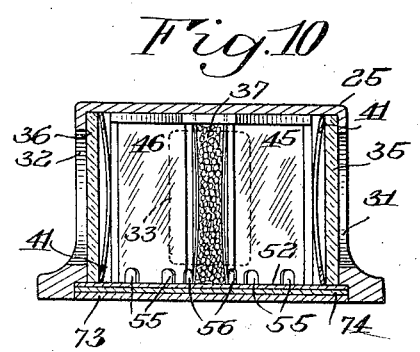
INVENTOR
Henry F. Kurtz
BY Edward H. Crumpton
his ATTORNEY Patented Nov. 1, 1932

1,885,842

UNITED STATES PATENT OFFICE

HENRY F. KURTZ, OF ROCHESTER, NEW YORK, ASSIGNOR TO BENNEVILLE LLOYD SINGLEY, OF MEADVILLE, PENNSYLVANIA

INDICATING LAMP FOR VEHICLES

Application filed April 19, 1930. Serial No. 445,659.

This invention relates to an indicating lamp for vehicles, such, for example, as a lamp intended to be placed on the running board of an automobile in position to indicate the extreme edge of the automobile to persons in front of or behind the vehicle.

An object of the invention is to provide a lamp having a simple and sturdy construction, which is easy and comparatively economical to manufacture, and which is exceedingly satisfactory in use.

Another object is to provide improved mounting or retaining means for certain optical elements of the lamp.

To these and other ends the invention resides in certain improvements and combinations of parts, all as will be hereinafter more fully described, the novel features being pointed out in the claims at the end of the specification.

In the drawings:

Fig. 1 is a plan of an automobile having a preferred embodiment of indicating lamp applied thereto;

Fig. 2 is a plan of the lamp on a larger scale showing a fragment of the running board of the automobile;

Fig. 3 is a side elevation thereof;

Fig. 4 is an end elevation thereof;

Fig. 5 is a vertical section taken longitudinally through the lamp substantially along the center line thereof;

Fig. 6 is a perspective view of a transparent plate and a resilient member for holding it in position;

Fig. 7 is a horizontal section through the lamp;

Fig. 8 is a transverse vertical section substantially on the line 8—8 of Fig. 7;

Fig. 9 is a similar view substantially on the line 9—9 of Fig. 7;

Fig. 10 is a similar view substantially on the line 10—10 of Fig. 7, and

Fig. 11 is a fragmentary bottom view of the lamp with parts removed and parts in section.

Similar reference numerals throughout the several views indicate the same parts.

The indicating lamp here disclosed is intended primarily for use upon the running board of an automobile, although it is capable also of other uses and might be employed to advantage on other forms of land vehicles, or on water craft or air craft. When used in the preferred manner on the running board of an automobile, as shown in Fig. 1, the lamp is intended to project a beam of light 20 forwardly so that it grazes the front mudguard, another beam 21 of light rearwardly so that it grazes the rear mudguard, and another beam of light 22 laterally so that it may be seen by a person approaching the automobile from the side. The forward and rearward beams of light 20 and 21 will show up the edges of the automobile in relief or silhouette in such manner that they may be distinguished clearly at night, thus greatly lessening the danger of collision. The general optical arrangements and properties of such a lamp form the subject matter of a copending patent application of Henry F. Kurtz, Serial No. 340,193, filed February 15, 1929, for vehicle light, now Patent No. 1,810,216, granted June 16, 1931. The lamp of the present application has substantially the same optical properties as the light disclosed in said copending application, but is an improvement on such other lamp in various details.

The present light comprises in general an integral one piece casing having a generally rectangular portion 25 and a generally semi-cylindrical portion 26 terminating in a rounded or spherical end 27. Integrally formed lugs 28 serve for attaching the lamp to the running board 29 of the automobile. Both the rectangular portion 25 and the semi-cylindrical portion 26 of the casing are open along one side, which side is the bottom of the casing when it is normally positioned on the vehicle.

The rectangular portion 25 of the casing constitutes a window chamber having a window opening in each of three sides thereof, as shown particularly in Fig. 7. One of these window openings is designated by the numeral 31, and is the front window when the lamp is positioned as in Fig. 1. There is also a rear window 32, and a window 33 which allows light to be projected laterally. Optical elements such as transparent sheets or plates cooperate with each of the three window openings in the casing not only to prevent entrance of dust and dirt into the casing, but also to color the light issuing from the windows in any desired manner.

The transparent plate associated with the front window 31 is indicated at 35, while the transparent closure associated with the rear window 32 is shown at 36, and the plate cooperating with the side window 33 is indicated at 37. All three of these transparent plates are preferably made of glass, although other transparent materials may be employed if desired. The member 37 has a pebbled or otherwise roughened inner surface so that the light passing through it will be somewhat dispersed and will spread out in a comparatively wide beam as indicated at 22 in Fig. 1. The members 35 and 36, however, are preferably plane on both surfaces so that they do not change the course of the light which is optically directed and controlled by the various other optical elements of the lamp, as fully set forth in the above mentioned copending application. The rear and side window glasses are preferably colored red, while the glass of the front window may be uncolored or may be tinted amber or other desired color.

Each of the transparent members 35, 36, and 37 is held in a pair of slots 40 formed integrally in the body 25 of the lamp, as shown most clearly in Fig. 7. The lamp body is preferably made of an integral one piece construction such as a die casting or the like, and these grooves or slots are formed integrally therein when the body is made. Each groove is considerably wider than the thickness of the transparent member, as is apparent from Figs. 5 and 7, and each member is held in place by a resilient spring member 41 of the shape best shown in Fig. 6. This resilient member extends substantially around the periphery of the associated transparent plate, and is cut away or apertured in the center to permit light to pass through it. Since the transparent plates are preferably rectangular in shape, the resilient members 41 are likewise rectangular, and have two sides curved out of the plane of the other two sides, as shown in Fig. 6. When such a resilient member is inserted in the slots 40 behind each of the transparent plates, the curved sides of the resilient member will contact at their mid portions with either the edges of the grooves or the transparent plate, depending on which side of the resilient member is toward the plate, and the extreme ends of the curved sides will contact with either the transparent plate or the grooves, thus holding the plate firmly in position in the grooves and preventing it from rattling or wabbling therein.

As has been stated above, the body or casing of the lamp is open at the bottom. The grooves 40 extend down to the bottom of the casing, and the transparent plates and resilient members are inserted in the grooves from the bottom, although ordinarily when the lamp is being assembled, it is turned up side down so that the bottom temporarily becomes the top. Fig. 11 is a fragmentary bottom view of the lamp, which is equivalent to a top plan when the lamp is turned up side down, and it shows that the grooves extend to the open bottom so that the parts may be easily inserted in them.

This lamp also includes a pair of reflecting optical elements such as the mirrors 45 and 46. These serve to reflect part of the light coming from the light source which will be described later, so that some light passes through the front window opening 31, other light passes through the rear window opening 32, and still another portion of the light passes between the mirrors 45 and 46 and out through the side window opening 33. The casing 25 is provided with grooves in the inner surface of the top of the casing, into which the upper ends of the mirrors 45 and 46 extend. These grooves, like the grooves 40 which contain the transparent plates, are wider than the thickness of the mirrors, to allow space for the insertion of the resilient retaining members 50 which may be similar to or identical with the members 41 used to hold the transparent plates in position. The mirrors 45 and 46 are preferably rectangular and of the same size as the members 35, 36, and 37, so that the resilient members 50 which hold the mirrors may be exactly identical with the members 41 which hold the transparent plates, thus reducing the cost of the lamp by making it necessary for the factory to keep on hand a supply of only one size and style of resilient member.

Due to the position of the mirrors in the casing, it is not conveniently possible to provide grooves for the side edges of the mirrors, although extensions or flanges 51 formed integrally with the casing lie behind the mirrors as illustrated in Fig. 7. Thus the only grooves in the casing for the mirrors are those into which the top edges of the mirrors and members 50 extend. It is necessary to provide some means for holding the bottom ends of the mirrors and of the resilient retaining members 50. This is accomplished by the use of a closure plate 52 which closes the open bottom of the portion 25 of the casing, and is held in place as by screws 53 extending into threaded holes 54 formed in the casing.

This plate 52 has lugs 55 and 56 formed thereon, preferably in the form of ears struck up from the plate as shown in Figs. 5 and 7. Of these, two lugs 55 contact with the front face of each mirror at the bottom end thereof and one lug 56 contacts with a side edge of the mirror at the bottom end, to define the position of the mirror. Fig. 11 shows these lugs in cross section, the plate 52 being omitted, and illustrates how the lugs hold the mirrors in proper position.

The spring members 50 are placed behind the mirrors with their top ends in the grooves in which the tops of the mirrors are received, and are reversed from the position of the member 41 illustrated in Fig. 6 so that the top and bottom ends of the members 50 are away from the mirrors, and the sides of the spring members contact at their centers with the mirror and tend to press it outwardly against the lugs 55 and against the side of the groove in which the top of the mirror is seated. The top ends of the spring members react against the opposite side of the groove, while the bottom ends react against the extensions 51 formed in the housing.

Substantially at the junction between the rectangular portion 25 and the semi-cylindrical portion 26 of the casing, there is a pair of inwardly extending flanges 60 formed integrally with the casing and having grooves 61 formed in the inner ends thereof. These grooves 61 serve to retain a mounting member such as the plate 62 which holds an optical element such as the lens 63. The plate is preferably provided with an aperture of slightly smaller diameter than the diameter of the lens, this aperture being indicated in Fig. 9 by the numeral 64, and one side of the lens is held against this aperture by lugs or ears 65 struck from the plate 62 and extending over the edge of the lens, as clearly shown in Figs. 9 and 11.

The mounting plate 62 itself is preferably substantially thinner than the thickness of the grooves 61, but is held firmly and tightly in the grooves because the edges of the plate which extend into the grooves are deformed at both top and bottom corners as at 66. These deformed portions press against one side of each groove while the main undeformed portion of the plate presses against the opposite side of the groove. In this way, the plate is held somewhat resiliently in the groove, and is retained firmly so that it will not rattle or move laterally in the casing.

The lens 63 and its mounting plate 62 are inserted into the grooves 61 from the bottom of the casing before the plate 52 is put in position. Then when the closure plate 52 is affixed, it not only holds the mirrors 45 and 46 in place, but also retains the transparent plates 35, 36, and 37 and their resilient retaining members, and also the lens 63 and its mounting member 62, all of these elements being prevented from moving downwardly out of their grooves by means of this closure plate 52.

The light source is preferably in the form of an incandescent bulb 70 removably mounted in the usual manner in a bayonet type socket 71 secured in a lug or ear 72 struck up from the main closure plate 73 of the lamp. The closure plate is also provided with an opening in which an insulating bushing $74^a$ is secured, through which bushing extends the wire $75^a$ to supply current to the lamp socket. In assembling the lamp, after all of the previously described optical elements have been assembled, and after the closure plate 52 has been put on to hold them in place, then the main closure plate 73 is positioned on the bottom of the lamp casing with a layer 74 of insulating material such as heavy paper on its inner face, and the placing of the main closure plate results in positioning the bulb 70 within the semi-cylindrical lamp chamber 26 of the casing, as clearly shown in Fig. 5. This closure plate preferably extends over substantially the entire bottom of the casing and covers the plate 52. The lamp is then applied to the running board 29 of the automobile, and bolts 75 are inserted through holes in the lugs 28 on the sides of the casing, and through registering holes in similar lugs on the main closure plate 73 and the insulating material 74, and through registering holes in the running board 29. Thus the two bolts 75 serve not only to hold the lamp in position on the running board, but also to retain the closure plate 73 in cooperative relation to the rest of the lamp, this closure plate being clamped between the main lamp housing and the running board, as plainly seen in Fig. 8.

In operation, the light from the illuminating unit 70 passes through the condenser lens 63 and part of it continues substantially straight through the space between the mirrors 45 and 46 to the glass 37. Due to the pebbled or otherwise roughened surface of this glass 37, this light is refracted and dispersed, and issues from the window 33 in the form of a relative wide beam as indicated at 22 in Fig. 1. Other light from the lamp 70, after passing through the lens 63, is reflected by the mirror 45 and passes through the front glass 35, issuing from the front window opening 31 to form a beam 20 as shown in Fig. 1. The remainder of the light which passes through the condenser lens falls upon the mirror 46 and is reflected rearwardly through the rear glass 36 and rear window 32 to form a beam 21. As will be seen in Fig. 5, the filament of the lamp 70 has its center slightly below the axis of the lens 63, with the result that the beams of light issuing from the vehicle lamp will have their lower edges substantially horizontal and their upper edges inclined upwardly, all as set forth in the above mentioned copending application.

The present construction provides an exceedingly simple and compact lamp, comprising but few parts, all of which may be made relatively easily. The one piece integral casing formed as a die casting or the like obviates the necessity of building up a sheet metal casing of several different pieces, with the consequent possibility of the pieces coming apart in use. The lamp may be quickly assembled, and when it is once assembled the various optical elements need not be again disturbed if it is necessary to replace the burned out bulb 70. The main closure plate 73 may be removed to obtain access to the bulb 70 to replace this bulb, without in any way disturbing the closure plate 52 which holds the optical elements in position.

While one embodiment of the invention has been disclosed, it is to be understood that the inventive idea may be carried out in a number of ways. This application is therefore not to be limited to the precise details disclosed, but is intended to cover all variations and modifications thereof falling within the spirit of the invention or the scope of the appended claims.

I claim:

1. An indicating lamp comprising, in combination, a body having a generally rectangular portion provided with a window in each of three sides thereof and a generally semi-cylindrical portion connected to said rectangular portion on a fourth side thereof to provide a light chamber, said rectangular portion and said semi-cylindrical portion each being open at one side, an electric illuminating unit in said light chamber to furnish light to pass through all of said windows, and a single closure member for closing the open side both of said rectangular portion and of said semi-cylindrical portion.

2. An indicating lamp comprising, in combination, a body having a generally rectangular portion provided with a window in each of three sides thereof and a generally semi-cylindrical portion connected to said rectangular portion on a fourth side thereof to provide a light chamber, said rectangular portion and said semi-cylindrical portion each being open at one side, a single closure member for closing the open side both of said rectangular portion and of said semi-cylindrical portion, and an electric illuminating unit mounted on said closure member in such position that when said closure member is in normal closed position, said unit will be positioned within said semi-cylindrical portion to furnish light to pass through all of said windows.

3. In an indicating lamp, the combination with a body having a window opening therein, of a source of light, an optical element positioned between said source of light and said window opening, and means for holding said optical element in such position, said means comprising a single bowed spring member of resilient sheet material arranged in the form of a hollow rectangle with two sides thereof adapted to engage a face of said optical element and the other two sides curved out of the plane of the first mentioned side, said spring member being flexible in a direction transverse to the plane of said optical element.

4. An indicating lamp comprising, in combination, a body having a window opening therein, said body having an opening on one side thereof and a guide groove formed integrally in said body, an illuminating unit in said body, a light reflecting element for reflecting light from said illuminating unit through said window opening, said reflecting element being seated in said groove, a plate attached to said body, and partially enclosing said second mentioned opening, and a struck up ear on said plate cooperating with said reflecting element to hold said element in place.

5. An indicating lamp comprising a body having an opening in one side, a plurality of optical elements insertable in said body and removable therefrom through said opening, a partial closure member for closing a part only of said opening to retain said optical elements in place, an illuminating unit within said body to furnish light to cooperate with said optical elements, and a closure member separate from said partial closure member for closing said opening in the body, so that said closure member may be removed for access to said illuminating unit without disturbing said optical elements.

HENRY F. KURTZ.